UNITED STATES PATENT OFFICE.

HAROLD S. ASHENHURST, OF CHICAGO, ILLINOIS, ASSIGNOR OF FOUR-FIFTHS TO JAMES J. REYNOLDS, OF CHICAGO, ILLINOIS.

HEAT-INSULATING MATERIAL AND PROCESS OF PRODUCING THE SAME.

1,230,085.  Specification of Letters Patent.  Patented June 12, 1917.

No Drawing.  Application filed October 30, 1916. Serial No. 128,433.

*To all whom it may concern:*

Be it known that I, HAROLD S. ASHENHURST, a citizen of the United States, and resident of Chicago, in the county of Cook and State of Illinois, have invented certain new and useful Improvements in Heat-Insulating Material and Processes of Producing the Same, of which the following is a specification.

My invention relates to a new and useful composition of matter, and has particular reference to a material adapted for use in many situations and more specially as a heat insulating material. This application is a continuation of my application Serial No. 60,683, filed November 10, 1915, in so far as the disclosures thereof are identical.

Materials which are substantially impervious to the transference of heat units, or which are, in other words, poor conductors of heat, are required in many locations, as, for instance, in the covering of steam or hot water pipes, as insulation in the walls of refrigerators and buildings, etc. A perfect insulating material should combine the qualities of lightness, resistance to extreme heat and stability of form or composition under such extremes of heat. To these qualities should be added cheapness in cost of production.

I have produced a new composition of matter which combines the qualities just mentioned, as well as many other qualities not referred to. A material produced in accordance with the directions given herein, may, if desired, be cast in place, such use thereof being contemplated in the construction of buildings, or as an adjunct thereto. The material when located in the walls of a building acts as a sound deadener and as a heat insulator in addition to being absolutely fireproof. The material, when formed as hereinafter directed, has a specific gravity of substantially 0.4, which is substantially that of white pine and only slightly greater than that of cork. This will give an idea of its extreme lightness. It will be understood, therefore, that the substance, when formed as directed, is very porous or sponge-like in character; each of the multitude of spaces, which are in the form of cells, acts as a dead air space, with the result that its insulating effect is little short of remarkable. I am aware, of course, that any material having this cellular structure would act as an insulating element, but the material of my invention combines the qualities of heat insulation, lightness, cheapness and stability as to form under extreme heat. The material is largely composed of a substance heretofore considered as useless, inasmuch as no use therefor, as far as I am aware, had been found. I utilize the asbestos recovered from the waste of asbestos mills. The asbestos thus recovered is in a comminuted condition, no fiber being apparent; in fact, a fibrous asbestos does not lend itself to the production of the most desirable form of the material. Although asbestos is considered to be the most desirable of any of the refractory materials for the present use, a desirable material can be produced by employing other refractory materials, such as mica, calcium sulfate, or kieselguhr. With this material I combine sulfate of aluminum which in the presence of water reacts with carbonate of calcium with the evolution of carbon dioxid according to the reaction

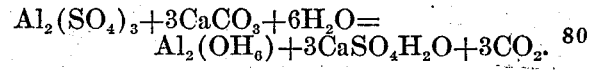

$$Al_2(SO_4)_3 + 3CaCO_3 + 6H_2O = Al_2(OH_6) + 3CaSO_4H_2O + 3CO_2.$$

The proportions preferably employed are substantially as follows: Thirty-two parts of the refractory material, eight parts of the sulfate and one part of the carbonate. The proportions, of course, may be varied in order to vary the structure of the material desired. For instance, if it is desirable to form the material with a more pronounced cellular structure; that is, wherein the spaces are larger, the quantity of the sulfate, and consequently of carbon dioxid, is increased. In some instances, it may be desirable that the material should set or harden more quickly, in which case I may add a quantity of plaster of Paris, (substantially anhydrous calcium sulfate). It will be understood that these variations in the materials and in the proportions of materials will result in a variation in the specific gravities of the resulting products. In some instances the specific gravity may be as high as 1, although for all practical commercial purposes it will be much less than that.

In practice, the materials referred to will be mixed in their dry state, in which condition the compound is inert and may be kept in such condition as long as desired. The materials being finely divided, a given weight thereof will occupy but a relatively small space. When, however, the insulating material is to be formed, a quantity of water is added, sufficient to form a paste, whereupon reaction begins, releasing a quantity of carbon dioxid which forms a multitude of cells in the gelatinous felty structure comprised of aluminum hydrate and asbestos, and materially increasing the size thereof. The reaction referred to will be complete within a short time and the calcium sulfate which is formed will take on its additional molecule of water and set so that the substance will become hard and rigid in the maintenance of its form, even under extreme heat, no change in appearance, or form, having been found to take place at a temperature of 3000 degrees F. As stated, after having become hardened, the material is very light, a cubic foot thereof weighing in the neighborhood of twenty-five pounds. After the substance has been mixed with water it may be poured into a mold for walls, floors or ceilings of a building, or within the walls of a refrigerator, or it may be cast around furnaces or steam pipes, or it may be cast in molds and applied to these locations by other means. By a series of tests, it has been found that the insulating value of this substance is greater than that of any other substance known to applicant. Primarily this substance is composed of magnesium silicate (asbestos), calcium carbonate and aluminum sulfate. The physical peculiarities of the composition are distinct from those of its primary constituents as follows: It is light without sacrificing strength, stable in air and of a peculiar spongy texture, each small void consisting of an individual cell more or less distinct from one another. Its reaction is nearly neutral, showing only a trace of alkalinity.

Its formation is due to direct interaction of the acid reacting sulfate of aluminum with calcium carbonate in the presence of an excess of water. This interaction results in the liberating of carbon dioxid, which exerts a leavening action on the mass, causing it to rise like a bread sponge. At the same time this rising occurs, there is formed a hydrate of aluminum ($Al_2OH_6$) (which either partially or wholly is in the form of a gelatinous colloidal salt) and sulfate of calcium ($CaSO_4$); this calcium sulfate takes on a molecule of water, thereby hydraulically setting. As there is present a quantity of finely divided asbestos, this results in toughening the mass by forming a felty substance with the aluminum hydroxid and the calcium sulfate. It is this felty mass which becomes inflated with carbon dioxid ($CO_2$), thus forming the innumerable cells found throughout the finished product.

The chemical process involved progresses rythmically as shown by the following equations:

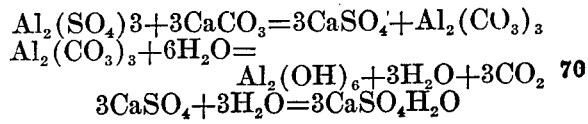

$$3CaSO_4 + 3H_2O = 3CaSO_4 H_2O$$

This progressive formula may be expressed in its entirety as

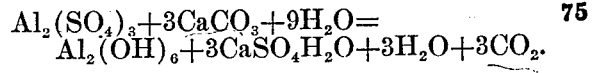

From its peculiar physical constitution this compound will combine the insulating properties of asbestos and dead air, each and every individual cell acting as an individual insulator.

It is possible that a method can be found whereby other sulfates, as for example ferrous sulfate, zinc sulfate or copper sulfate may be used to replace part of the aluminum sulfate or all of it. If, however, these sulfates are used it will be necessary to add a quantity of sulfuric acid to the solution of sulfates together with a colloid, such as dextrin, glue or gelatin. This is necessary as the hydrates of the above enumerated sulfates have not sufficient cohesion to form a felty mass, as aluminum sulfate has.

Obviously the exact proportion referred to need not be strictly followed in order to secure a desirable result. Other variations in the composition may also be made, and I do not, therefore, wish to be limited, except as indicated by the scope of my claims.

I claim:

1. A new composition of matter in the form of a solid, having a distinctly cellular structure and containing a silicate in the form of asbestos as the major constituent, aluminum hydrate and calcium sulfate, substantially as described.

2. A new composition of matter in the form of a cellular solid body having a specific gravity of substantially .4 and containing a silicate in the form of asbestos as the major constituent, aluminum hydrate and calcium sulfate, substantially as described.

3. A new composition of matter having a distinctly cellular structure and a specific gravity less than 1 and composed principally of finely divided asbestos and calcium sulfate.

4. A composition of matter having a pronounced cellular structure and a specific gravity less than 1 and composed of asbestos in a comminuted condition and a substance which hydraulically sets following the reaction by which the cellular structure is formed.

5. A composition of matter having a pronounced cellular structure and a specific gravity less than 1 and composed of asbestos in a comminuted condition, aluminum hydrate and a substance which hydraulically sets following the reaction by which the cellular structure is formed.

6. The process of forming a cellular insulating material having a specific gravity less than 1 and which is insoluble and highly refractory, which consists in combining in the presence of water a silicate in a finely divided condition, and a plurality of substances, the combination of which cause a reaction whereby a gas is released, the mass is expanded by the gas and a multitude of cells is formed therein, and which mass later hydraulically sets, substantially as described.

7. The process of forming a cellular insulating material which consists in combining in the presence of water substantially thirty-two parts of a silicate which is inert in the subsequent reaction and which substance forms the major constituent of the final product, eight parts of a salt having a strong acid radical and one part of calcium carbonate, said last mentioned substances reacting to release a gas which permeates the mass, increasing the size of the mass, which mass finally hydraulically sets, substantially as described.

Signed at Chicago, Illinois, this 28th day of October, 1916.

HAROLD S. ASHENHURST.

Witnesses:
H. C. JACOBS,
T. D. BUTLER.

Copies of this patent may be obtained for five cents each, by addressing the "Commissioner of Patents, Washington, D. C."